US012662018B2

(12) United States Patent
Namuduri et al.

(10) Patent No.: US 12,662,018 B2
(45) Date of Patent: Jun. 23, 2026

(54) CONTROL OF START-UP OPERATION IN ELECTRIC VEHICLE

(71) Applicant: GM GLOBAL TECHNOLOGY OPERATIONS LLC, Detroit, MI (US)

(72) Inventors: Chandra S. Namuduri, Troy, MI (US); Rasoul Hosseini, Troy, MI (US); Dae Young Kim, Madison Heights, MI (US); Firas Shabo, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 275 days.

(21) Appl. No.: 18/671,333

(22) Filed: May 22, 2024

(65) Prior Publication Data

US 2025/0364903 A1 Nov. 27, 2025

(51) Int. Cl.
B60L 58/20 (2019.01)
B60L 53/20 (2019.01)
B60L 53/22 (2019.01)

(52) U.S. Cl.
CPC .............. B60L 58/20 (2019.02); B60L 53/20 (2019.02); B60L 53/22 (2019.02)

(58) Field of Classification Search
CPC .......... B60L 58/20; B60L 53/22; B60L 53/20; B60L 53/16; H02M 1/0032; H02M 1/10
See application file for complete search history.

(56) References Cited

U.S. PATENT DOCUMENTS

| 2020/0298722 A1 | 9/2020 | Smolenaers | |
| 2021/0354589 A1* | 11/2021 | Wand | B60L 50/15 |
| 2024/0181928 A1* | 6/2024 | Namuduri | B60L 53/62 |

FOREIGN PATENT DOCUMENTS

DE 102022132265 A1 * 6/2023 ........ H02M 3/33584

* cited by examiner

*Primary Examiner* — Syed O Hasan
(74) *Attorney, Agent, or Firm* — Quinn IP Law

(57) ABSTRACT

A system for controlling a start-up operation of an electric vehicle includes a high voltage electrical propulsion unit and a controller. The high voltage electrical propulsion unit includes at least one battery pack, a high voltage bus, one or more power components, a first group of switches, and a second group of switches. An onboard charger is adapted to deliver adjustable current to pre-charge the high voltage bus during the start-up operation. The first group of switches selectively connect the at least one battery pack to a propulsion high voltage (HV) bus and the second group of switches selectively connect the at least one battery pack to a charge port high voltage (HV) bus. The controller is adapted to control operation of the first group of switches and the second group of switches to enable pre-charging of the high voltage bus during the start-up operation.

16 Claims, 5 Drawing Sheets

300

302 — Verify switches are open and charge port unplugged

304 — Close SB1, SB2, enable OBCM with predefined settings

306 — When bus voltage is within delta value, close SA1, SA2

308 — Disable OBCM and open SB1, SB2

310 — Set propulsion commands

312 — When propulsion ends, redirect

400

402 — Verify switches are open and charger connected to port

404 — Request Vbat and enable OBCM with predefined settings

406 — When bus voltage is within delta value, close SA1, SA2

408 — Disable OBCM and close SB1, SB2

410 — Request DC charging current with predefined settings

412 — If charging completed, disable charger and open second set

502 — Verify switches are open and charger connected to port

504 — Enable OBCM with predefined settings

506 — When bus voltage is within delta value, close SA1, SA2

508 — Revert OBCM to standby mode

510 — Request AC charging current with predefined settings

512 — If charging completed, disable charger and open first set

CONTROL OF START-UP OPERATION IN ELECTRIC VEHICLE

INTRODUCTION

The present disclosure relates to a system and method for controlling a start-up operation of an electric vehicle. The use of mobile platforms employing a rechargeable energy source, both as an exclusive source of energy and a non-exclusive source of energy, has greatly increased over the last few years. A rechargeable energy storage device in an electric vehicle may store and release electrochemical energy as needed during a given operating mode. The electrochemical energy may be employed for propulsion, heating or cooling a cabin compartment, powering vehicle accessories and other uses. An electric vehicle generally includes a dedicated pre-charge circuit employed in the start-up of the high-voltage propulsion system.

SUMMARY

Disclosed herein is a system for controlling a start-up operation of an electric vehicle having a high voltage electrical propulsion unit. The high voltage electrical propulsion unit includes at least one battery pack ("at least one" omitted henceforth), a high voltage bus, one or more power components, a first group of switches, and a second group of switches. An onboard charger is adapted to deliver adjustable current to pre-charge the high voltage bus during the start-up operation. A charge port is directly coupled to an input of the onboard charger. A controller is in communication with the onboard charger, the controller having a processor and tangible, non-transitory memory on which instructions are recorded for selectively executing one or more modes. The first group of switches selectively connect the at least one battery pack to a propulsion high voltage (HV) bus and the second group of switches selectively connect the at least one battery pack to a charge port high voltage (HV) bus. The controller is adapted to control operation of the first group of switches and the second group of switches to enable pre-charging of the high voltage bus during the start-up operation.

The electric vehicle may be defined by an absence of a dedicated pre-charge circuit for the start-up operation of the high voltage propulsion bus. The power components may include an accessory power module and at least one power inverter module. The onboard charger is adapted to be operable from a direct current input voltage and an alternating current input voltage from the charge port. The onboard charger may be configured to permit bidirectional current flow.

In some embodiments, the first group of switches selectively connect a direct current output of the onboard charger to the battery pack. The first group of switches may selectively disconnect the at least one battery pack from the propulsion HV bus. The second group of switches is adapted to isolate the charge port and the charge port HV bus from the at least one battery pack when the electric vehicle is keyed off or in driving mode. The controller is adapted to enable the onboard charger by setting an output current of the onboard charger to a predefined allowable pre-charge current and setting an output voltage limit of the onboard charger to a battery voltage of the at least one battery pack.

The modes may include a propulsion mode. Execution of the propulsion mode includes verifying that the first group of switches and the second group of switches are open, and the charge port is unplugged, closing the second group of switches and enabling the onboard charger. Execution of the propulsion mode includes closing the first group of switches when a bus voltage across the propulsion HV bus is within a predefined delta value of the battery voltage, disabling the onboard charger, opening the second group of switches, and setting propulsion commands.

The modes may include a direct current (DC) charging mode. Execution of the DC charging mode includes verifying that the first group of switches and the second group of switches are open, and the onboard charger is connected to the charge port. Execution of the DC charging mode includes commanding the charger to apply a voltage equal to the battery voltage and enabling the onboard charger, closing the first group of switches when a bus voltage across the propulsion HV bus is within a predefined delta value of the battery voltage. Execution of the DC charging mode includes disabling the onboard charger, closing the second group of switches, and requesting a DC charging current from an external charger.

The modes may include an alternating current (AC) charging mode. Execution of the AC charging mode includes verifying that the first group of switches and the second group of switches are open, and the onboard charger is connected to the charge port. Execution of the AC charging mode includes commanding the charger to apply a voltage equal to the battery voltage, and enabling the onboard charger. Execution of the AC charging mode includes closing the first group of switches when a bus voltage across the propulsion HV bus is within a predefined delta value of the battery voltage, reverting the onboard charger to a standby mode, and requesting an AC charging current.

Disclosed herein is a method for controlling a start-up operation of an electric vehicle having a high voltage electrical propulsion unit, an onboard charger, and a controller with a processor and tangible, non-transitory memory. The method includes connecting at least one battery pack, a high voltage bus, one or more power components, a first group of switches, and a second group of switches in the high voltage electrical propulsion unit. The method includes directly coupling a charge port to a charger input of the onboard charger, delivering adjustable current to pre-charge the high voltage bus during the start-up operation, via the onboard charger. The method includes selectively connecting the at least one battery pack to a propulsion high voltage (HV) bus via the first group of switches, and selectively connecting the at least one battery pack to a charge port high voltage (HV) bus via the second group of switches. The method includes controlling operation of the first group of switches and the second group of switches, via the controller, to enable pre-charging of the high voltage bus during the start-up operation.

The above features and advantages and other features and advantages of the present disclosure are readily apparent from the following detailed description of the best modes for carrying out the disclosure when taken in connection with the accompanying drawings.

Figure 1:
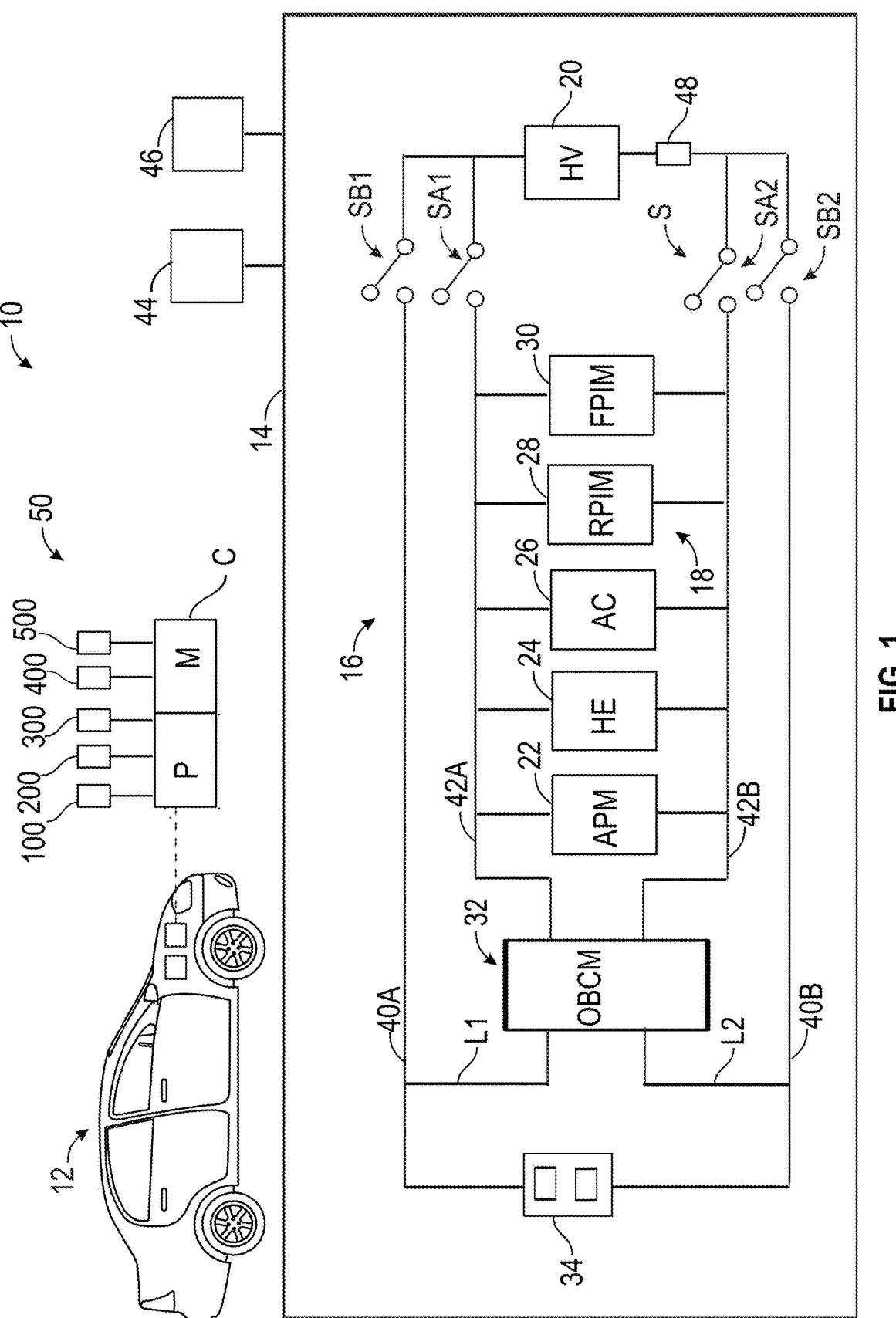
FIG. 1 is a schematic diagram of a system for controlling operation of a high voltage electrical propulsion unit in an electric vehicle, the system having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for controlling a start-up operation of an electric vehicle 12 having a high voltage electrical propulsion unit 14. It is understood that the electric vehicle 12 may be partially electric or fully electric and may include multiple sources of energy. The electric vehicle 12 may be a mobile platform, such as, but not limited to, a passenger vehicle, sport utility vehicle, light truck, heavy duty vehicle, ATV, minivan, bus, transit vehicle, bicycle, moving robot, farm implement (e.g., tractor), sports-related equipment (e.g., golf cart), boat, plane and train. The electric vehicle 12 may take many different forms and have additional components.

Referring to FIG. 1, the high voltage electrical propulsion unit 14 includes a high voltage bus 16 with multiple power components 18 and at least one battery pack 20 (e.g., a high voltage battery unit). The power components 18 may include, but are not limited to, an accessory power module (APM) 22, a heating module (HE) 24, an air-conditioning electronic compressor (ACEC) module 26, and power inverter modules (e.g., rear power inverter module 28 and front power inverter module 30).

An electric vehicle generally includes a dedicated pre-charge circuit, such as a pre-charge relay and series resistor across a main high voltage relay, employed in the start-up of the high-voltage propulsion unit 14 to minimize the inrush current drawn by capacitive elements within the multiple power components 18 operating off the high voltage bus 16. The system 10 enables pre-charging of the high voltage bus 16 in the electric vehicle 12 during a start-up operation without using a dedicated pre-charge circuit. In other words, the system 10 eliminates a physical structure (the pre-charge circuit) while retaining its function.

Referring to FIG. 1, an onboard charger 32 (sometimes referred to as onboard charge module or "OBCM") is adapted to deliver adjustable current to pre-charge the high voltage bus 16 during the start-up operation. Referring to FIG. 1, the vehicle 12 may undergo a direct current (DC) fast-charging operation in which the battery pack 20 is electrically connected to an external charger or off-board DC fast-charging station (not shown), via a charge port 34. The onboard charger 32 is adapted to be receptive to or operable from a DC input voltage and an AC input voltage from the charge port 34. Referring to FIG. 1, the high voltage electrical propulsion unit 14 includes one or more switches S to selectively connect the battery pack 20 to the charge port 34 (e.g., combined DC/AC charge port, such as a North American Charging System—NACS standard receptacle).

In the embodiment shown, the switches S include a first group of switches (SA1, SA2) and a second group of switches (SB1, SB2). Referring to FIG. 1, the first group of switches (SA1, SA2) selectively connect the battery pack 20 to a propulsion high voltage (HV) bus 42A, 42B. The second group of switches (SB1, SB2) selectively connect the battery pack 20 to a charge port high voltage bus 40A, 40B (or the charger input lines L1, L2), also referred to herein as a DC fast charging high voltage (HV) bus 40A, 40B. The second group of switches (SB1, SB2) is adapted to isolate the charge port and the charge port HV bus from the battery pack 20 when the electric vehicle 12 is keyed off or in driving mode.

Referring to FIG. 1, the system 10 includes a controller C with at least one processor P and at least one memory M (or non-transitory, tangible computer readable storage medium) on which instructions are recorded. The memory M may store controller-executable instruction sets, and the processor P may execute the controller-executable instruction sets stored in the memory M. The controller C is adapted to control operation of the first group of switches (SA1, SA2) and the second group of switches (SB1, SB2) to enable pre-charging of the high voltage bus 16 during the start-up operation.

As described below, when pre-charge is enabled, the second group of switches (SB1, SB2) is closed to connect a charger input of the onboard charger 32 to the battery pack 20. The charger output may be commanded to be ramped up using a constant current charging of the capacitors on the high voltage bus. Alternately, a ramp output voltage command may be used for the onboard charger 32 to gradually increase the bus voltage until it matches the battery voltage.

Once pre-charging is complete, the onboard charger 32 and the first group of switches (SA1, SA2) are turned OFF, and the power components 18 on the high voltage bus 16 may be operated per vehicle propulsion controller commands. In case of vehicle charging, the high voltage bus 16 may be pre-charged directly from the (AC/DC) charge port 34 via the onboard charger 32. The onboard charger 32 may be configured to permit bidirectional current flow (e.g., AC/DC-in on a first port to DC-out on a second port or DC-in on the second port to AC/DC-out on the first port).

It is understood that the number of switch(es) in the group may be varied based on the application. In some embodiments, the "group" may include a single switch. The switches S may take different forms. In some embodiments, the switches S include at least one electro-mechanical contactor. The switches S may include at least one solid-state switch and/or a diode. The switches S may include contactors, which are electrically operated switches, or relays which are electromagnetic switches.

The system 10 may include an energy source 44 (e.g., twelve-volt battery) to pre-charge the battery pack 20. Referring to FIG. 1, the high voltage electrical propulsion unit 14 is coupled to an electric motor 46 that generates torque. The system 10 may include fault switch 48 for instantaneously disconnecting the battery pack 20 from the rest of the vehicle electrical components in the event of a fault condition.

Referring to FIG. 1, the controller C is adapted to selectively execute one or more modes 50 for controlling operation of the electric vehicle 12. The controller C is adapted to modify the respective position of the switches S during execution of the modes 50, in response to various input signals. Table 1 below shows the respective position of the first group of switches (SA1, SA2) and the second group of switches (SB1, SB2) during various operating conditions of the electric vehicle 12.

TABLE 1

| Condition/Switch | SA1 | SA2 | SB1 | SB2 | Onboard Charger |
|---|---|---|---|---|---|
| Key-off | OFF | OFF | OFF | OFF | OFF |
| Start-up | OFF | OFF | ON | ON | ON |
| Propulsion Run | ON | ON | OFF | OFF | OFF |
| Cabin Conditioning | OFF | OFF | OFF | OFF | ON |
| DC Fast Charging | ON | ON | ON | ON | ON |
| AC Charging | ON | ON | OFF | OFF | ON |

The modes 50 include a first mode 100 (key-off), a second mode 200 (start-up), a third mode 300 (propulsion run and cabin conditioning), a fourth mode 400 (DC charging) and a fifth mode 500 (AC charging), which are described below with respect to FIGS. 2-5. Each of the modes 50 of FIG. 1 may be embodied as computer-readable code or instructions stored on and partially executable by the controller C of FIG. 1. It is understood that the modes 50 are independent of one another. The modes 50 need not be applied in the specific order recited herein. Furthermore, it is to be understood that some steps may be eliminated.

The modes 50 may be dynamically executed. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
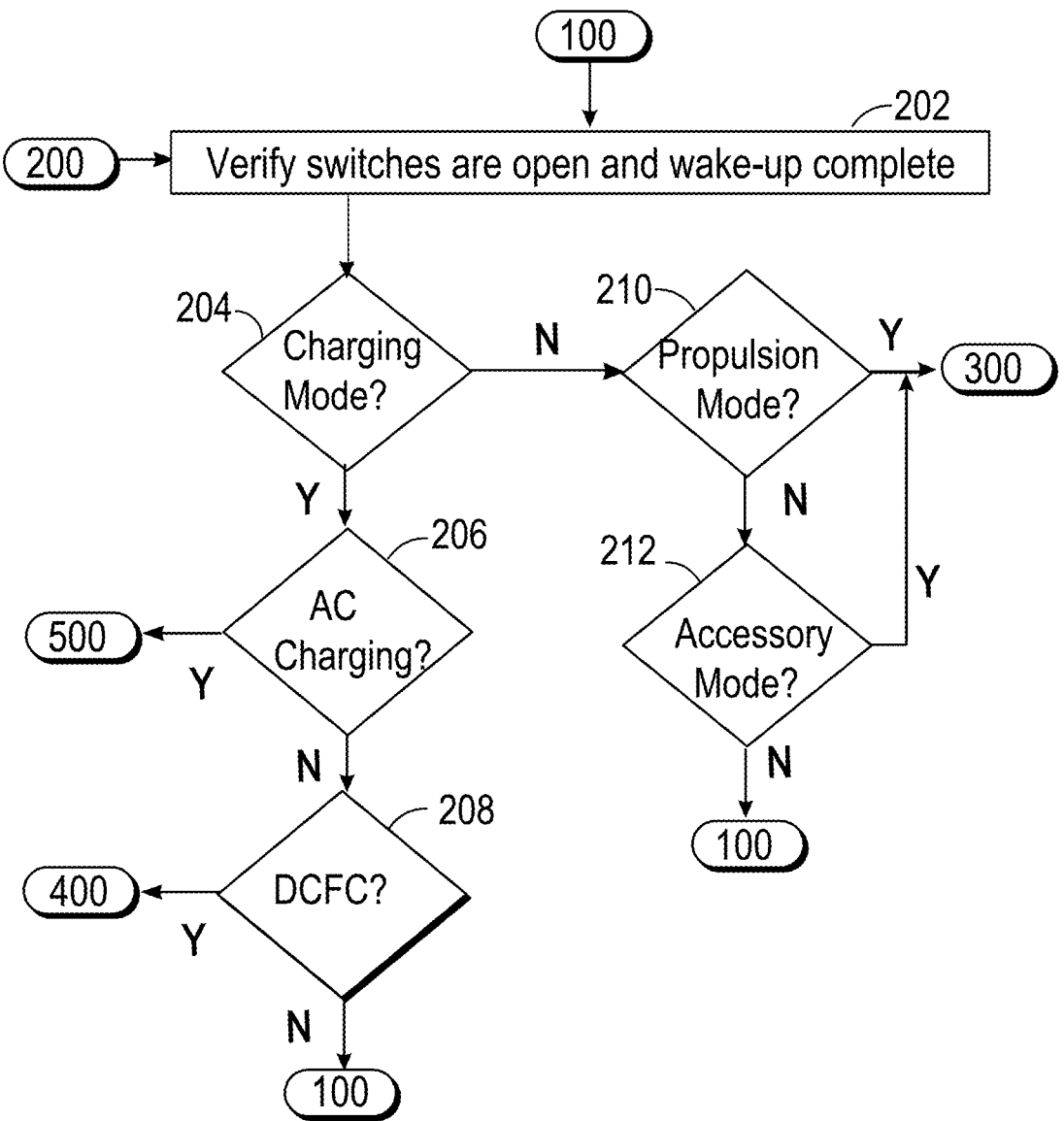
FIG. 2 is a schematic flow diagram of a first and second mode executable by the controller of FIG. 1.

Referring now to FIG. 2, a flowchart of the first and second modes 100, 200 stored on and executable by the controller C of FIG. 1 is shown. The first mode 100 is executed during a key-off condition or mode of the electric vehicle 12. The second mode 200 is executed during a start-up condition or mode. Execution of the first and second modes 100, 200 begins with block 202, where the controller C is adapted to verify that the first group of switches (SA1, SA2) and the second group of switches (SB1, SB2) are open (OFF) and wake-up operation is complete.

Proceeding to block 204, the controller C is adapted to determine if a charging mode is requested. If a charging mode is requested (block 204=YES), the controller C advances to block 206 to determine if an AC charging mode is requested. If an AC charging mode is requested (block 206=YES), the fifth mode 500 (see FIG. 5) is executed. If an AC charging mode is not requested (block 206=NO), the controller C advances to block 208 to determine if a DC charging mode is requested. If a DC charging mode is requested (block 208=YES), the fourth mode 400 (see FIG. 4) is executed. If a DC charging mode is not requested (block 208=NO), the first mode 100 is re-executed (looped back).

Referring to FIG. 2, if a charging mode is not requested (block 204=NO), the controller C advances to block 210 to determine if a propulsion mode is requested. If a propulsion mode is requested (block 210=YES), the third mode 300 (see FIG. 3) is executed. If a propulsion mode is not requested (block 210=NO), the controller C advances to block 212 to determine if an accessory mode is requested. If an accessory mode is requested (block 212=YES), the third mode 300 (see FIG. 3) is executed. If an accessory mode is not requested (block 212=NO), the first mode 100 is re-executed (looped back).

Figure 3:
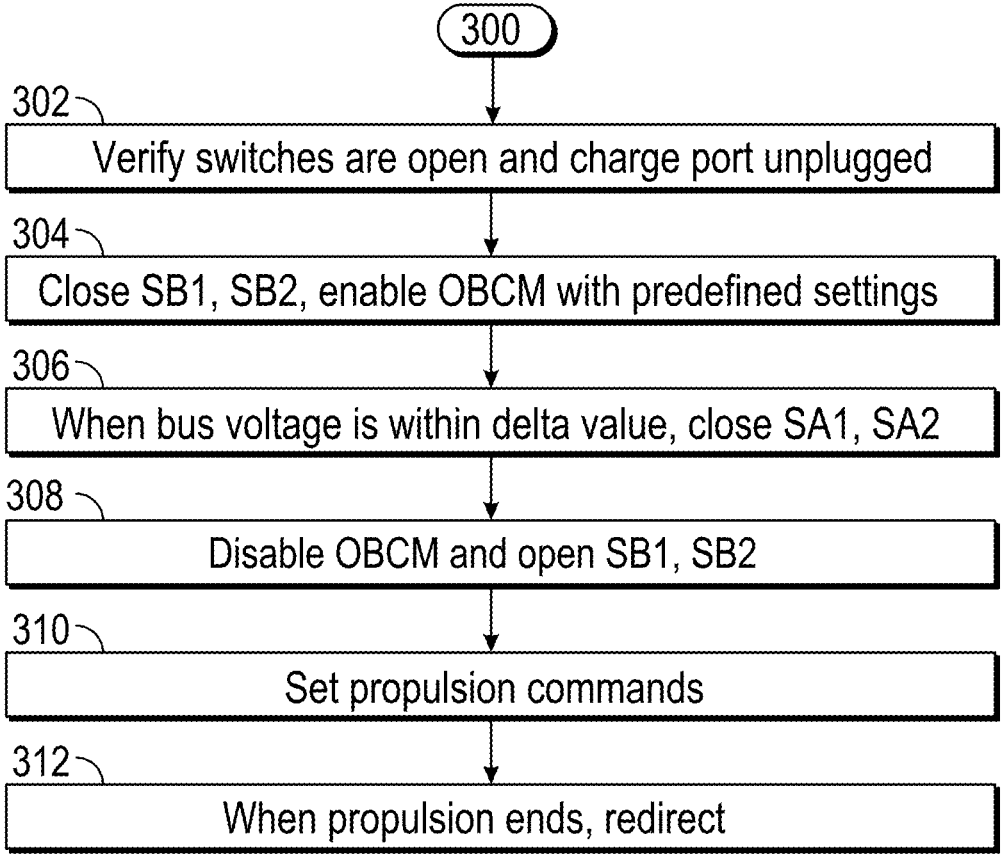
FIG. 3 is a schematic flow diagram of a third mode executable by the controller of FIG. 1.

Referring now to FIG. 3, a flowchart of the third mode 300 stored on and executable by the controller C of FIG. 1 is shown. Execution of the third mode 300 begins with block 302, where the controller C is adapted to verify that the first group of switches (SA1, SA2) and the second group of switches (SB1, SB2) are open (OFF) and the charge port 34 is unplugged or disconnected.

Advancing next to block 304, the controller C is adapted to close the second group of switches (SB1, SB2) and enable the onboard charger 32 such that the output current is set to a predefined allowable pre-charge current ($I_{out}=I_{precharge}$). The output voltage limit ($V_{out}$) is set to the battery voltage ($V_{batt}$) of the battery pack 20. Per block 306, the controller C is adapted to wait until the bus voltage across the propulsion HV bus is within a predefined delta value ($\Delta V$) of the battery voltage, then close (turn ON) the first group of switches (SA1, SA2). In other words, the controller C is adapted to wait until the absolute value of the difference between $V_{bus}$ and $V_{batt}$ is less than $\Delta V$ ($|V_{bus}-V_{batt}|\leq\Delta V$). It is understood that the predefined allowable pre-charge current and the predefined delta value may be varied based on the application at hand.

Advancing to block 308, the controller C is adapted to disable the onboard charger 32 and open (turn OFF) the second group of switches (SB1, SB2). Proceeding to block 310, the controller C is adapted to set propulsion commands responsive to the torque demands of the electric vehicle 12. When propulsion ends, per block 312, the controller C may be adapted to redirect to the first mode 100 or the second mode 200 based on whether a key-off condition is satisfied.

Figure 4:
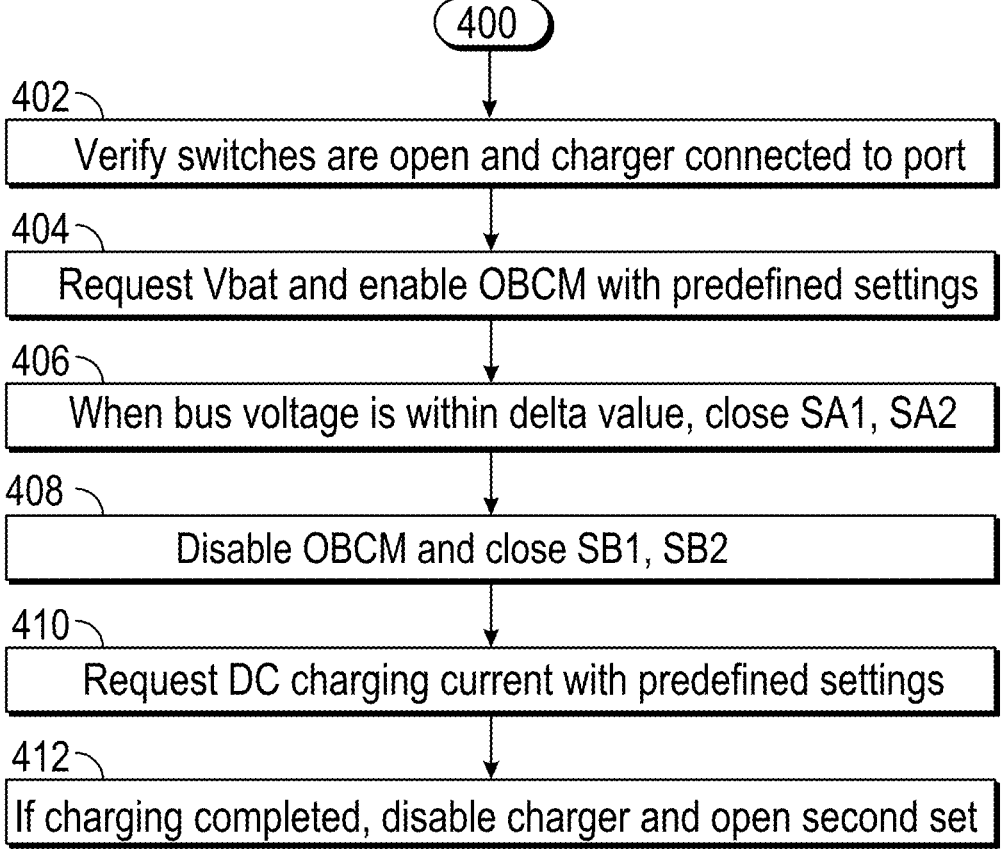
FIG. 4 is a schematic flow diagram of a fourth mode executable by the controller of FIG. 1.

Referring now to FIG. 4, a flowchart of the fourth mode 400 stored on and executable by the controller C of FIG. 1 is shown. Execution of the fourth mode 400 begins with block 402, where the controller C is adapted to verify that the first group of switches (SA1, SA2) and the second group of switches (SB1, SB2) are open (OFF) and the onboard charger 32 is connected to the charge port 34.

Advancing to block 404, the controller C is adapted to command the onboard charger 32 to apply a voltage equal to the battery voltage and enable the onboard charger 32 such that the output current is set to a predefined allowable pre-charge current. The output voltage limit is set to a battery voltage of the battery pack 20. Per block 406, the controller C is adapted to wait until the bus voltage across the propulsion HV bus is within a predefined delta value ($\Delta V$) of the battery voltage ($V_{bus}-V_{batt}\leq\Delta V$), then close (turn ON) the first group of switches (SA1, SA2).

Advancing to block 408, the controller C is adapted to disable the onboard charger 32 and close (turn ON) the second group of switches (SB1, SB2). Proceeding to block 410, the controller C is adapted to requesting a DC charging current via the DC fast charging HV bus (see 42A, 42B). When the charging is completed, per block 412, the controller C is adapted to open (turn OFF) the second group of switches (SB1, SB2) and redirect to the first mode 100 or second mode 200.

Figure 5:
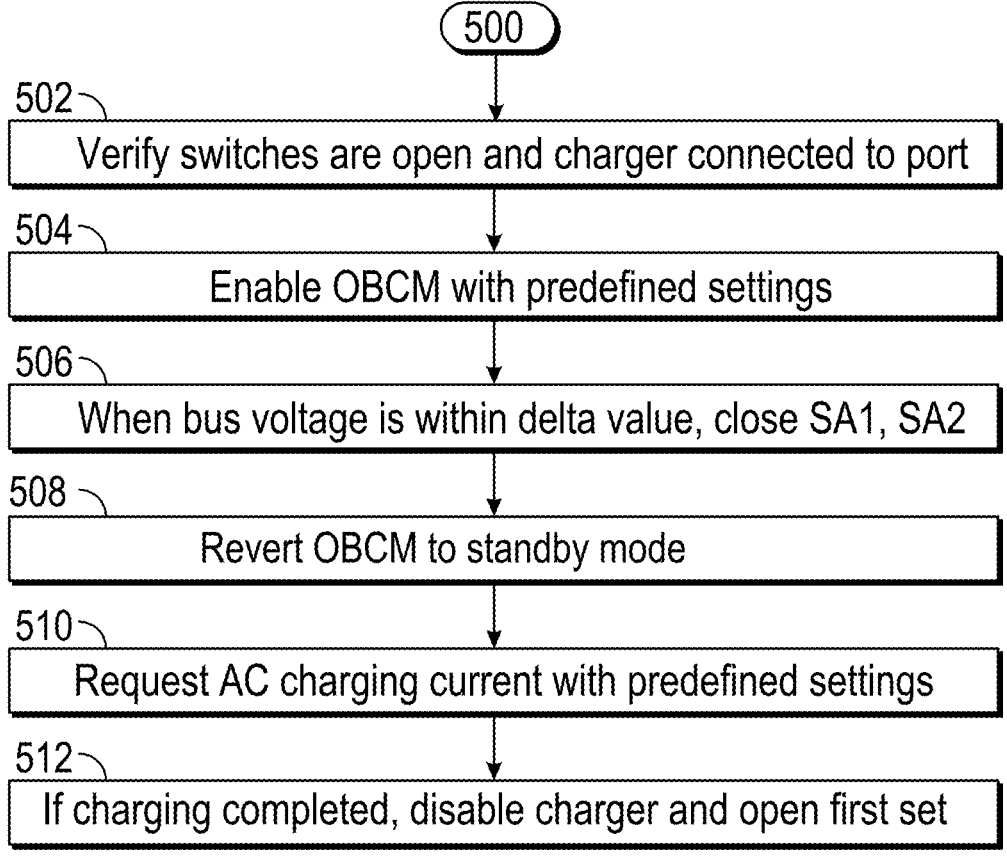
FIG. 5 is a schematic flow diagram of a fifth mode executable by the controller of FIG. 1.

Referring now to FIG. 5, a flowchart of the fifth mode 500 stored on and executable by the controller C of FIG. 1 is shown. Execution of the fifth mode 500 begins with block 502, where the controller C is adapted to verify that the first group of switches (SA1, SA2) and the second group of switches (SB1, SB2) are open (OFF) and the onboard charger 32 is connected to the charge port 34.

Advancing to block 504, the controller C is adapted to enable the onboard charger 32 with the output current being set to a predefined allowable pre-charge current ($I_{out}=I_{precharge}$). The output voltage limit ($V_{out}$) is set to the battery voltage ($V_{batt}$) of the battery pack 20. Per block 506, the controller C is adapted to wait until the bus voltage across the propulsion HV bus is within a predefined delta value (ΔV) of the battery voltage, then close (turn ON) the first group of switches (SA1, SA2).

Advancing to block 508, the controller C is adapted to revert the onboard charger 32 to a standby mode. Proceeding to block 510, the controller C is adapted to requesting AC charging current via connections L1 and L2, shown in FIG. 1. When AC charging is completed, per block 512, the controller C may be adapted to disable the onboard charger 32, open the first group of switches (SA1, SA2) and redirect to the first mode 100 or second mode 200.

In summary, the system 10 enables pre-charging of the high voltage bus 16 during propulsion or charging start-up operations. When pre-charge is enabled, the second group of switches (SB1, SB2) are closed to connect the charger input of the onboard charger 32 to the battery pack 20, with the charger output being commanded to be ramped up using a constant current charging of the capacitors on the high voltage bus 16. Alternately, a ramp output voltage command may be used for the onboard charger 32 to gradually increase the bus voltage until it matches the battery voltage. In some embodiments, the onboard charger 32 may be adapted to bypass or disable its power factor correction (PFC) stage during the DC fast charging mode. The power factor may be corrected during the PFC stage using filtering processes. The onboard charger 32 may be of a single-stage or two-stage power conversion type. The onboard charger 32 may further be used to diagnose the high voltage bus capacitor during pre-charge operation from the voltage rate of rise under constant charging current.

The various components of the system 10 may be adapted to communicate via a wireless network (not shown). The wireless network may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network may be WIFI or a Bluetooth™ connection, defined as being a short-range radio technology (or wireless technology) aimed at simplifying communications among Internet devices and between devices and the Internet. Other types of connections may be employed.

The controller C of FIG. 1 may be an integral portion of, or a separate module operatively connected to, other controllers of the electric vehicle 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database energy system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts shown illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling a start-up operation of an electric vehicle, the system comprising:

a high voltage electrical propulsion unit including at least one battery pack, a high voltage bus, one or more power components, a first group of switches, and a second group of switches;

an onboard charger adapted to deliver adjustable current to pre-charge the high voltage bus during the start-up operation;

a charge port directly coupled to an input of the onboard charger;

a controller in communication with the onboard charger, the controller having a processor and tangible, non-transitory memory on which instructions are recorded for selectively executing one or more modes, including a direct current (DC) charging mode;

wherein the first group of switches selectively connect the at least one battery pack to a propulsion high voltage (HV) bus and the second group of switches selectively connect the at least one battery pack to a charge port high voltage (HV) bus; and wherein the controller is adapted to control operation of the first group of switches and the second group of switches to enable pre-charging of the high voltage bus during the start-up operation;

wherein the controller is adapted to enable the onboard charger by setting an output current of the onboard charger to a predefined allowable pre-charge current and setting an output voltage limit of the onboard charger to a battery voltage of the at least one battery pack; and wherein the controller is adapted to execute the DC charging mode by:

verifying that the first group of switches and the second group of switches are open, and the onboard charger is connected to the charge port;

commanding the charger to apply a voltage equal to the battery voltage and enabling the onboard charger;

when a bus voltage across the propulsion HV bus is within a predefined delta value of the battery voltage, closing the first group of switches; and disabling the onboard charger, closing the second group of switches and requesting a DC charging current from an external charger.

2. The system of claim 1, wherein the electric vehicle is defined by an absence of a dedicated pre-charge circuit for the start-up operation of the high voltage bus.

3. The system of claim 1, wherein the one or more power components includes an accessory power module and at least one power inverter module.

4. The system of claim 1, wherein the onboard charger is adapted to be operable from a direct current input voltage and an alternating current input voltage from the charge port.

5. The system of claim 1, wherein the onboard charger is configured to permit bidirectional current flow.

6. The system of claim 1, wherein:

the first group of switches selectively connect a direct current output of the onboard charger to the at least one battery pack;

the first group of switches selectively disconnect the at least one battery pack from the propulsion HV bus; and the second group of switches is adapted to isolate the charge port and the charge port HV bus from the at least one battery pack when the electric vehicle is keyed off or in driving mode.

7. The system of claim 1, wherein the one or more modes includes a propulsion mode, execution of the propulsion mode including:

verifying that the first group of switches and the second group of switches are open, and the charge port is unplugged;

closing the second group of switches and enabling the onboard charger;

when a bus voltage across the propulsion HV bus is within a predefined delta value of the battery voltage, closing the first group of switches; and disabling the onboard charger, opening the second group of switches and setting propulsion commands.

8. The system of claim 1, wherein the one or more modes includes an alternating current (AC) charging mode, execution of the AC charging mode including:

verifying that the first group of switches and the second group of switches are open, and the onboard charger is connected to the charge port;

commanding the charger to apply a voltage equal to the battery voltage and enabling the onboard charger;

when a bus voltage across the propulsion HV bus is within a predefined delta value of the battery voltage, closing the first group of switches; and reverting the onboard charger to a standby mode and requesting an AC charging current.

9. A method for controlling a start-up operation of an electric vehicle having a high voltage electrical propulsion unit, an onboard charger, and a controller with a processor and tangible, non-transitory memory, the method comprising:

connecting at least one battery pack, a high voltage bus, one or more power components, a first group of switches, and a second group of switches in the high voltage electrical propulsion unit;

directly coupling a charge port to a charger input of the onboard charger;

delivering adjustable current to pre-charge the high voltage bus during the start-up operation, via the onboard charger;

selectively connecting the at least one battery pack to a propulsion high voltage (HV) bus via the first group of switches;

selectively connecting the at least one battery pack to a charge port high voltage (HV) bus via the second group of switches; and controlling operation of the first group of switches and the second group of switches, via the controller, to enable pre-charging of the high voltage bus during the start-up operation;

enabling the onboard charger, via the controller, by setting an output current of the onboard charger to a predefined allowable pre-charge current and setting an output voltage limit of the onboard charger to a battery voltage of the at least one battery pack, the first group of switches defining a propulsion HV bus when the first group of switches is closed; and executing a propulsion mode, via the controller, including:

verifying that the first group of switches and the second group of switches are open, and the charge port is unplugged;

closing the second group of switches and enabling the onboard charger;

when a bus voltage across the propulsion HV bus is within a predefined delta value of the battery voltage, closing the first group of switches; and disabling the onboard charger, opening the second group of switches and setting propulsion commands.

10. The method of claim 9, further comprising:

incorporating an accessory power module and at least one power inverter module in the one or more power components, the electric vehicle being defined by an absence of a dedicated pre-charge circuit for the start-up operation of the high voltage bus.

11. The method of claim 9, further comprising:

isolating the charge port from the at least one battery pack during a driving mode and key-off mode of the electric vehicle via the second group of switches; and adapting the onboard charger to be operable from a direct current input voltage and an alternating current input voltage from the charge port and configuring the onboard charger to permit bidirectional current flow.

12. The method of claim 9, further comprising executing a direct current (DC) charging mode, via the controller, including:

verifying that the first group of switches and the second group of switches are open, and the onboard charger is connected to the charge port;

commanding the charger to apply a voltage equal to the battery voltage and enabling the onboard charger;

when a bus voltage across the propulsion HV bus is within a predefined delta value of the battery voltage, closing the first group of switches; and disabling the onboard charger, closing the second group of switches and requesting a DC charging current.

13. The method of claim 9, further comprising executing an alternating current (AC) charging mode, via the controller, including:

verifying that the first group of switches and the second group of switches are open, and the onboard charger is connected to the charge port;

enabling the onboard charger;

when a bus voltage across the propulsion HV bus is within a predefined delta value of the battery voltage, closing the first group of switches; and reverting the onboard charger to a standby mode and requesting an AC charging current.

14. An electric vehicle comprising:

a high voltage electrical propulsion unit including at least one battery pack, a high voltage bus, one or more power components, a first group of switches, and a second group of switches;

an onboard charger adapted to deliver adjustable current to pre-charge the high voltage bus during a start-up operation;

a charge port directly coupled to an input of the onboard charger;

a controller in communication with the onboard charger, the controller having a processor and tangible, non-transitory memory on which instructions are recorded for selectively executing one or more modes, including an alternating current (AC) charging mode;

wherein the first group of switches selectively connect the at least one battery pack to a propulsion high voltage (HV) bus;

wherein the second group of switches selectively connect the at least one battery pack to a charge port high voltage (HV) bus; and wherein the controller is adapted to control operation of the first group of switches and the second group of switches to enable pre-charging of the high voltage bus during the start-up operation;

wherein the controller is adapted to enable the onboard charger by setting an output current of the onboard charger to a predefined allowable pre-charge current and setting an output voltage limit of the onboard charger to a battery voltage of the at least one battery pack; and wherein the controller is adapted to execute the AC charging mode by:

verifying that the first group of switches and the second group of switches are open, and the onboard charger is connected to the charge port;

commanding the charger to apply a voltage equal to the battery voltage and enabling the onboard charger;

when a bus voltage across the propulsion HV bus is within a predefined delta value of the battery voltage, closing the first group of switches; and reverting the onboard charger to a standby mode and requesting an AC charging current.

15. The electric vehicle of claim 14, wherein the second group of switches is adapted to isolate the charge port from the at least one battery pack during a driving mode and a key-off mode of the electric vehicle; and wherein the electric vehicle is defined by an absence of a dedicated pre-charge circuit for the start-up operation of the high voltage bus.

16. The electric vehicle of claim 15, wherein the onboard charger is adapted to be operable from a direct current input voltage and an alternating current input voltage from the charge port, the onboard charger being configured to permit bidirectional current flow.

* * * * *